United States Patent
Okuda et al.

(10) Patent No.: US 8,807,522 B2
(45) Date of Patent: Aug. 19, 2014

(54) POSITIONER

(71) Applicant: Azbil Corporation, Tokyo (JP)

(72) Inventors: Kouji Okuda, Tokyo (JP); Hiroaki Nagoya, Tokyo (JP); Yoshio Maehana, Yokohama (JP)

(73) Assignee: Azbil Corporation, Tokyo (JP)

( * ) Notice: Subject to any disclaimer, the term of this patent is extended or adjusted under 35 U.S.C. 154(b) by 63 days.

(21) Appl. No.: 13/650,117

(22) Filed: Oct. 11, 2012

(65) Prior Publication Data

US 2013/0092854 A1  Apr. 18, 2013

(30) Foreign Application Priority Data

Oct. 14, 2011  (JP) .................................. 2011-226985

(51) Int. Cl.
*F16K 31/02* (2006.01)
*F15B 9/07* (2006.01)

(52) U.S. Cl.
CPC .. *F15B 9/07* (2013.01); *F16K 31/02* (2013.01)
USPC ................... 251/129.04; 251/129.01; 700/37; 700/41; 700/282; 700/302

(58) Field of Classification Search
CPC .............. F15B 9/07; F15B 9/09; F16K 31/02; F16K 31/04; G05B 15/02; G05B 19/02
USPC ............... 137/85, 487.5; 251/129.01, 129.04; 700/37, 41, 55, 282, 302
See application file for complete search history.

(56) References Cited

U.S. PATENT DOCUMENTS

| | | | | | |
|---|---|---|---|---|---|
| 3,371,248 | A | * | 2/1968 | Schatz | 361/18 |
| 3,388,764 | A | * | 6/1968 | Wood | 180/177 |
| 3,497,794 | A | * | 2/1970 | Gothe et al. | 323/282 |
| 3,567,849 | A | * | 3/1971 | Takayanagi et al. | 386/202 |
| 4,350,940 | A | * | 9/1982 | Dupont | 318/603 |
| 6,519,508 | B1 | * | 2/2003 | Saito | 700/282 |
| 6,907,082 | B1 | * | 6/2005 | Loechner | 375/257 |
| 7,167,537 | B2 | * | 1/2007 | Loechner | 375/377 |
| 8,049,361 | B2 | * | 11/2011 | Kielb et al. | 307/36 |

FOREIGN PATENT DOCUMENTS

| | | |
|---|---|---|
| JP | 11-304033 | 11/1999 |
| JP | 2004-151941 | 5/2004 |
| JP | 3596293 | 9/2004 |

* cited by examiner

*Primary Examiner* — John K Fristoe, Jr.
*Assistant Examiner* — Matthew W Jellett
(74) *Attorney, Agent, or Firm* — Troutman Sanders LLP (57) ABSTRACT

A variable impedance circuit is provided as an active load between an input line L1 and an output line L2. This circuit has low impedance with respect to a DC electric current signal and has high impedance with respect to an AC electric current signal, structured from a series circuit of resistors R1, R2, and R3 connected between lines L1 and L2; a transistor Q1 having the collector connected to the line L1 and the base connected between the resistors R2 and R3; a resistor R4 connected between the emitter of the transistor Q1 and the line L2; a capacitor C1 with one end connected between the resistors R2 and R3; a resistor R5 connected between the other end of the capacitor C1 and the line L2; a capacitor C2 having one end connected between the resistors R1 and R2; and a resistor R6 connected between the other end of the capacitor C2 and the line L2.

2 Claims, 10 Drawing Sheets

BACKGROUND ART

BACKGROUND ART

FIG. 10

BACKGROUND ART

POSITIONER

CROSS-REFERENCE TO PRIOR APPLICATION

This application claims priority to Japanese Patent Application No. 2011-226985, filed Oct. 14, 2011. This application is incorporated herein by reference in its entirety.

FIELD OF TECHNOLOGY

The present invention relates to a positioner for receiving a supply of a DC electric current signal through a pair of electric wires from a higher-level system to produce its own operating power supply from the DC electric current signal that is supplied, and for controlling the degree of opening of a regulator valve (valve) in accordance with a value of the supplied DC electric current signal.

BACKGROUND

Conventionally this type of positioner is designed so as to operate with an electric current between 4 and 20 mA (a DC electric signal) sent through a pair of electric wires from a higher-level system. For example, if a current of 4 mA is sent from the higher-level system, the opening of the regulator valve is set to 0%, and if a current of 20 mA is sent, then the opening of the regulator valve is set to 100%.

In this case, the supplied electric current from the higher-level system varies in the range of 4 mA (the lower limit electric current value) through 20 mA (the higher limit electric current value), and thus the internal circuitry within the positioner produces an operating power supply itself from an electric current of no more than the 4 mA that can always be secured as an electric current value that is supplied from the higher-level system. (See, For Example, Japanese Unexamined Patent Application Publication 2004-151941 ("JP '941").)

The opening setting value for the regulator valve is inputted into the positioner by the higher-level system. Moreover, the actual opening value for the regulator valve is obtained through the opening sensor. Consequently, the positioner is able to perform regulator valve fault diagnostics, self-diagnostics, and the like, through performing calculations on the relationship between the opening setting value and the actual opening value for the regulator valve. The provision of such fault diagnostic functions in the positioner makes it possible to increase the functionality of the system at a low cost, through eliminating the need for providing a separate fault diagnosing device. (See, for example, JP '941.)

Figure 8:
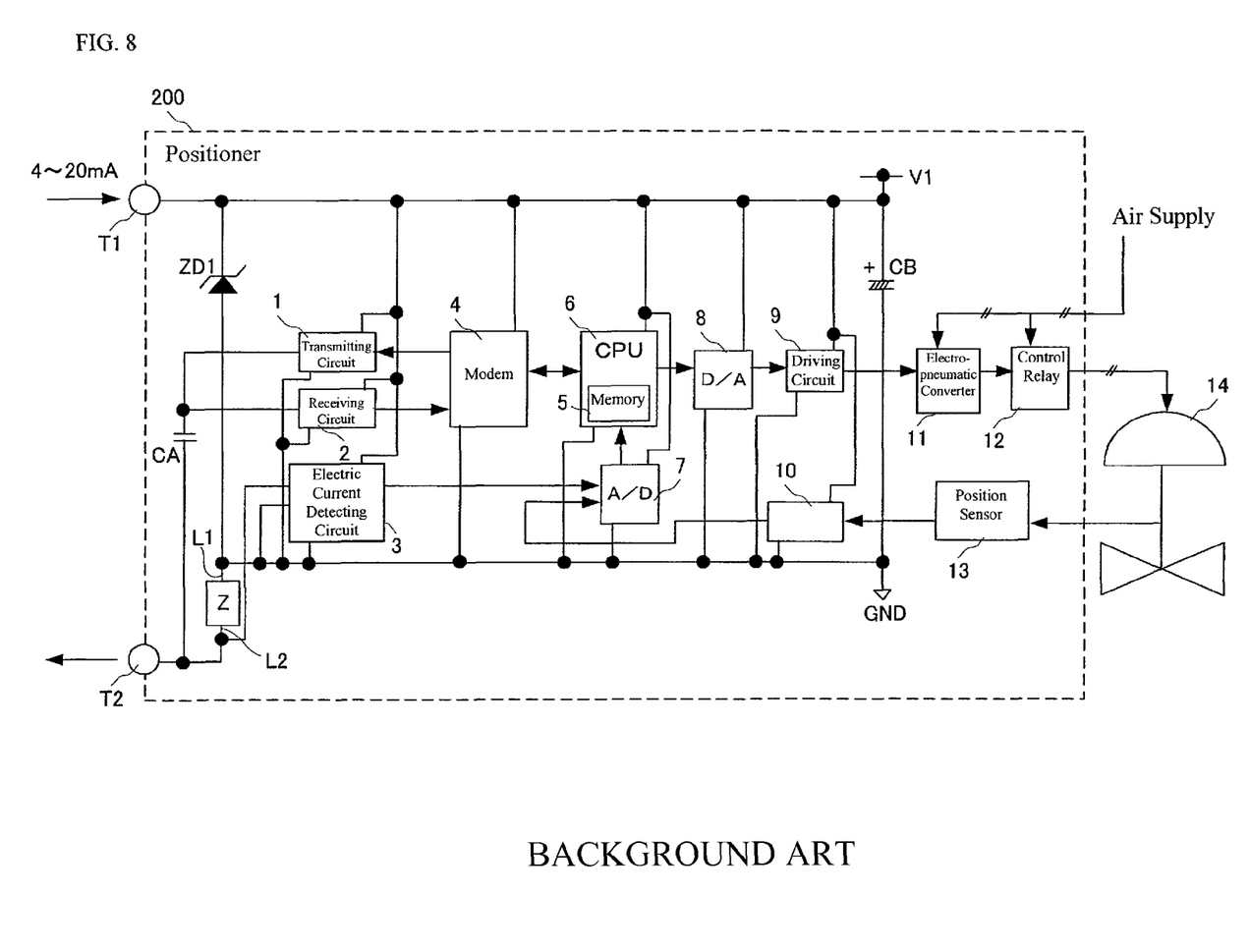
FIG. 8 is a diagram illustrating components in a conventional positioner that can communicate with a higher-level system.

For reasons such as these, in recent years there have been proposals for positioners that have, in addition to their actual functions of controlling the degree of opening of the regulator valves, also opening degree transmitting functions, regulator valve fault diagnostics, and functions for sending, to the higher-level system, the results of fault self-diagnostics, and the like. FIG. 8 shows the structure of the critical components of a positioner that has a communication function for the higher-level system. (See, for example, Japanese Unexamined Patent Application Publication H11-304033 (Japanese Patent Application Number 3596293).)

In FIG. 8, the input terminals T1 and T2 input DC electric current signals that are between 4 and 20 mA. A zener diode ZD1 is connected through a resistor RA to the input terminals T1 and T2, to produce a power supply voltage for use by the internal circuitry such as the modem 4 and the CPU 6, and the like. A capacitor CA is inserted between the transmitting circuit 1 and receiving circuit 2 and the input terminal T2, thus providing DC insulation between the power supply voltage V1 and the digital communication signals. A capacitor CB is a decoupling circuit for the power supply voltage V1, to prevent transfer or feedback of energy between the power supply voltage V1 and the ground GND.

A transmitting circuit 1 sends, through digital communications, a response signal to the higher-level system. A receiving circuit 2 receives a request signal, from the higher-level system, requesting a transmission. Here the higher-level system is connected to the input terminals T1 and T2 through two transmission lines (a pair of electric wires). Moreover, the impedance due to the resistor RA is used effectively in the digital communications in the transmitting and receiving circuits 1 and 2 in order to maintain a communication amplitude above a given voltage level. An electric current detecting circuit 3 is for detecting the value of the electric current signal that is inputted into the input terminals T1 and T2, and sends the detected signal to an A/D converting device 7.

A modem 4 is for performing modulation and demodulation of the digital signals of the transmitting and receiving circuits 1 and 2, and exchanges the contents of those signals with a CPU 6. The CPU 6 performs the digital communications and the positional control of a regulator valve 14, and has a communication processing program, for request signals, response signals, and the like, and a controlling program, such as PID, control, or the like, stored in a memory 5. Because the control output of the CPU 6 is a digital signal, it is converted into an analog signal by the D/A converting device 8.

A driving circuit 9 amplifies, and adjusts the impedance of, the analog signal that is sent from the D/A converting device 8, and sends the result to an electropneumatic converting module 11. A sensor interface circuit 10 processes a signal of a position sensor 13, and sends it to the A/D converting device 7. The A/D converting device 7 digitizes the inputted electric current signal from the electric current detecting circuit 3 and the position signal for the regulator valve, sent from the sensor interface circuit 10, and sends the result to the CPU 6.

The electropneumatic converting module 11 is for converting the inputted driving current into a pneumatic signal, and controls the pneumatic pressure of a nozzle through a torque motor. A control relay 12 is for amplifying the pneumatic signal, where the opening and closing of the regulator valve 14 is driven by the amplified pneumatic signal. The opening/closing control of the regulator valve 14 is performed through the position signal of the position sensor 13 being sent to the CPU 6 through the sensor interface circuit 10 and the A/D converting device 7, through the CPU 6 performing controlling calculations, and through the control output being sent to the driving circuit 9 through the D/A converting circuit 8. As a result, the regulator valve 14 is driven to control the degree of opening to the target value through the following path: driving circuit 9→electropneumatic converting module 11→control relay 12→regulator valve 14.

In the positioner 100, an AC electric current signal is superimposed on the DC electric current signal that is between 4 and 20 mA, to enable communication between the system on the higher-level side and the positioner 100. As the content of this communication there are exchanged control parameters for the control calculations pertaining to the regulator valve 14, amounts of adjustment of the zero/span point, the signal outputs of the position sensor, and self-diagnostic results, as the content of the communications. The communication data is read in through the following path: the receiving circuit 2→the modem 4→the CPU 6; and the transmission of the communication data is through the following path: the CPU 6→the modem 4→the transmitting circuit 1. The DC electric current signal inputted into the positioner 100 is recognized through the following path: the electric current detecting circuit 3→the A/D converting device 7→the CPU 6.

Figure 9:
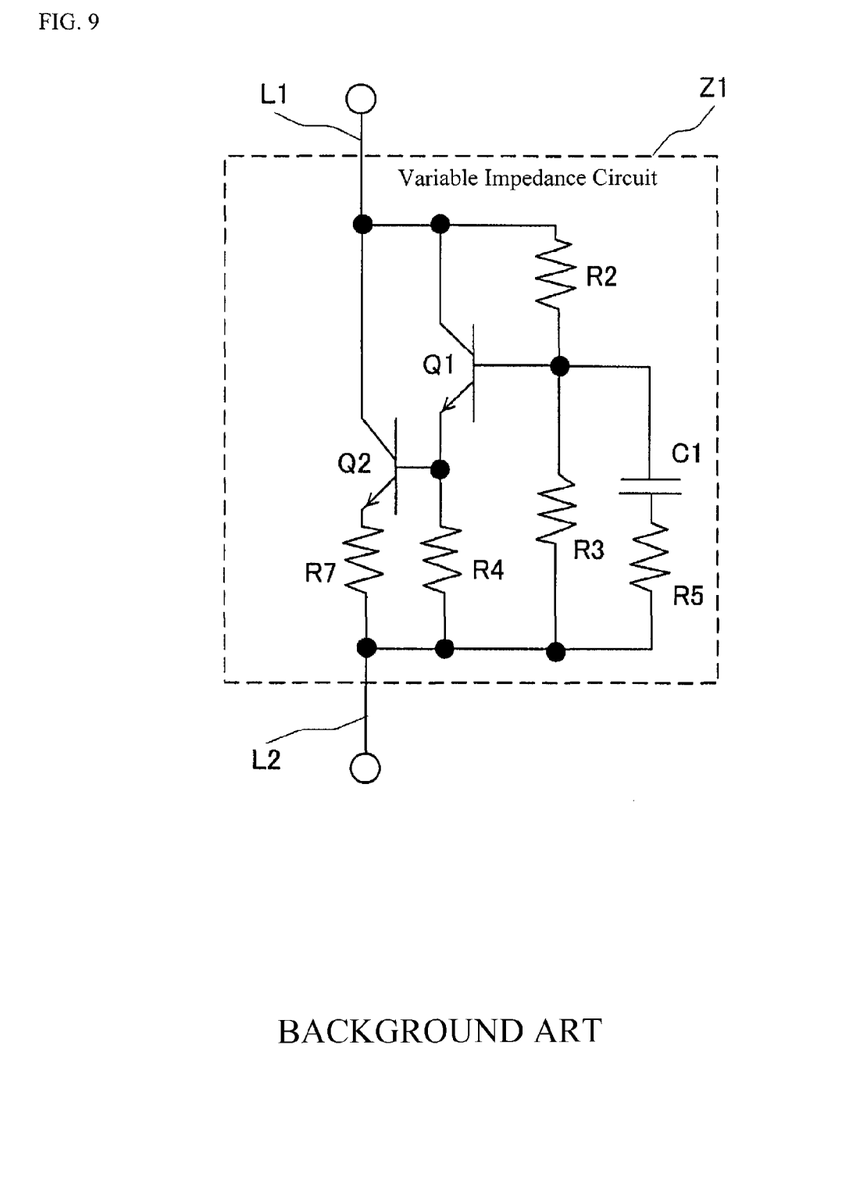
FIG. 9 is a diagram illustrating the configuration of a variable impedance circuit used as an active load in the conventional positioner.

In the positioner 100, in order to perform the digital communications, the resistor RA must be above about 250 ohms, so the voltage drop will be more than 5 V with an inputted electric current of 20 mA, causing the voltage V1 that is produced by the zener diode ZD1 to become smaller. Given this, a variable impedance circuit Z1, as illustrated in FIG. 9, is used as an active load instead of the resistor RA.

In the variable impedance circuit Z1, the transistor Q2 has the collector connected to a line L1, and the emitter connected to a line L2 through a resistor R7. The transistor Q1 has its collector connected to the line L1 and connected through a resistor R2 to the base thereof, and the emitter is connected to the base of the transistor Q2, and also connected to the line L2 through a resistor R4. The base of the transistor Q1 is connected to the line L2 through a parallel circuit of the resistor R3 with a capacitor C1 and a resistor R5. Note that the line L1 is a line connected to the zener diode ZD1, and the line L2 is a line connected to the terminal T2.

Figure 10:
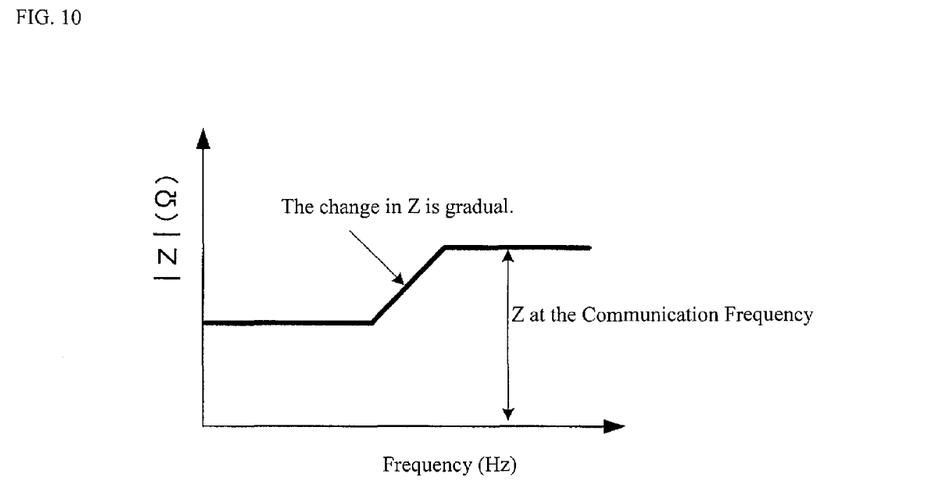
FIG. 10 is an impedance characteristic diagram illustrating the variable impedance circuit used in the conventional positioner.

FIG. 10 is an impedance characteristic diagram for the variable impedance circuit Z1. As can be understood from the impedance characteristic diagram, the variable impedance circuit Z1 has characteristics wherein the impedance (|Z|) is low in the low-frequency domain and the impedance (|Z|) is high in the high-frequency domain. That is, it has characteristics wherein the impedance is low for a DC electric current signal, and the impedance for an AC electric current signal is higher than the impedance for the DC electric current signal. The use of such a variable impedance circuit Z1 makes it possible to reduce the voltage drop in the variable impedance circuit Z1, to thereby increase the voltage V1 that is produced by the zener diode ZD1.

However, in a positioner that uses this variable impedance circuit Z1, as can be understood also from the impedance characteristic diagram illustrated in FIG. 10, the characteristics are gradual at the transition point from the low frequencies wherein the impedance is low to the high frequencies wherein the impedance is high, and thus there is a problem in that it is susceptible to the effects of low-frequency noise.

The present invention was created to solve such a problem, and the object thereof is to provide a positioner that is robust to the effects of low-frequency noise.

SUMMARY

In order to achieve the aforementioned object, the example of the present invention is a positioner for receiving a DC electric current through a pair of electric wires from a higher-level system, generating a local operating power supply from the DC electric current signal, along with controlling a degree of opening of a regulator valve in accordance with a value of the DC electric current signal, and receiving an AC electric current signal that is superimposed on the DC electric signal current, including a variable impedance circuit wherein the impedance relative to the DC electric current signal is low and the impedance relative to the AC electric current signal is higher than the impedance relative to the DC electric current signal; wherein: the variable impedance circuit has an input line for a DC electric current signal and an AC electric current signal that is superimposed on the DC electric current signal; an output line for a DC electric current signal and an AC electric current signal that is superimposed on the DC electric current signal; a series circuit of a first resistor, a second resistor, and a third resistor, connected between the input line and the output line; a transistor having the collector thereof connected to the input line and the base thereof connected to connecting point between the second resistor and the third resistor; a fourth resistor connected between the emitter of the transistor and the output line; a first capacitor having one end thereof connected to connecting point between the second resistor and the third resistor; a fifth resistor connected between the other end of the first capacitor and the output line; a second capacitor having one end thereof connected to the connecting point between the first resistor and the second resistor; a sixth resistor connected between the other end of the second capacitor and the output line; a second transistor having the collector thereof connected to the input line and having the base thereof connected to the connecting point between the emitter of the first transistor and the fourth resistor; and a seventh resistor connected between the emitter of the second transistor and the output line.

Given the present invention, the structure is one wherein a low-pass filter, wherein the time constant is determined primarily by the first resistor, the second capacitor, and the sixth resistor, is added to the low-pass filter, wherein the time constant is determined primarily by the second resistor, the first capacitor, and the fifth resistor, thus causing the characteristics of the transition point from the low frequencies wherein the impedance is low to the high frequencies wherein the impedance is high to be sharp, and thus robust to the effects of low-frequency noise.

In the present invention, the variable impedance circuit may be structured omitting the second transistor and the seventh resistor. That is, the variable impedance circuit may be structured from: an input line for a DC electric current signal and an AC electric current signal that is superimposed on the DC electric current signal; an output line for a DC electric current signal and an AC electric current signal that is superimposed on the DC electric current signal; a series circuit of a first resistor, a second resistor, and a third resistor, connected between the input line and the output line; a transistor having the collector thereof connected to the input line and the base thereof connected to connecting point between the second resistor and the third resistor; a fourth resistor connected between the emitter of the transistor and the output line; a first capacitor having one end thereof connected to connecting point between the second resistor and the third resistor; a fifth resistor connected between the other end of the first capacitor and the output line; a second capacitor having one end thereof connected to the connecting point between the first resistor and the second resistor; and a sixth resistor connected between the other end of the second capacitor and the output line. Given this, the variable impedance circuit operates using only a single transistor, thus reducing the impedance on the DC frequency side, and making it possible to reduce the voltage drop in the variable impedance circuit.

In the example of the present invention, one end of a second capacitor is connected to the connecting point between a first resistor and a second resistor, and a sixth resistor is connected between the other end of the second capacitor and the output line, and thus the structure is one wherein a low-pass filter wherein the time constant is determined primarily by the first resistor, the second capacitor, and the sixth resistor is added to the low-pass filter wherein the time constant is determined primarily by the second resistor, the first capacitor, and the fifth resistor, so that the characteristics of the transition point from the low frequencies wherein the impedance is low to the high frequencies wherein the impedance is high will be sharp, producing the effect of being robust to the effects of low-frequency noise.

In the example of the present invention, the variable impedance circuit may be structured omitting the second transistor and the seventh resistor so that the variable impedance circuit operates using only a single transistor, reducing the impedance on the DC frequency side. This enables a further reduction in the voltage drop in the variable impedance circuit, which, in addition to the effect of being robust to low-frequency noise, adds also the effect of the ability to achieve double connections between the transmission path of the two transmission lines, or connection of another load.

DETAILED DESCRIPTION

Figure 1:
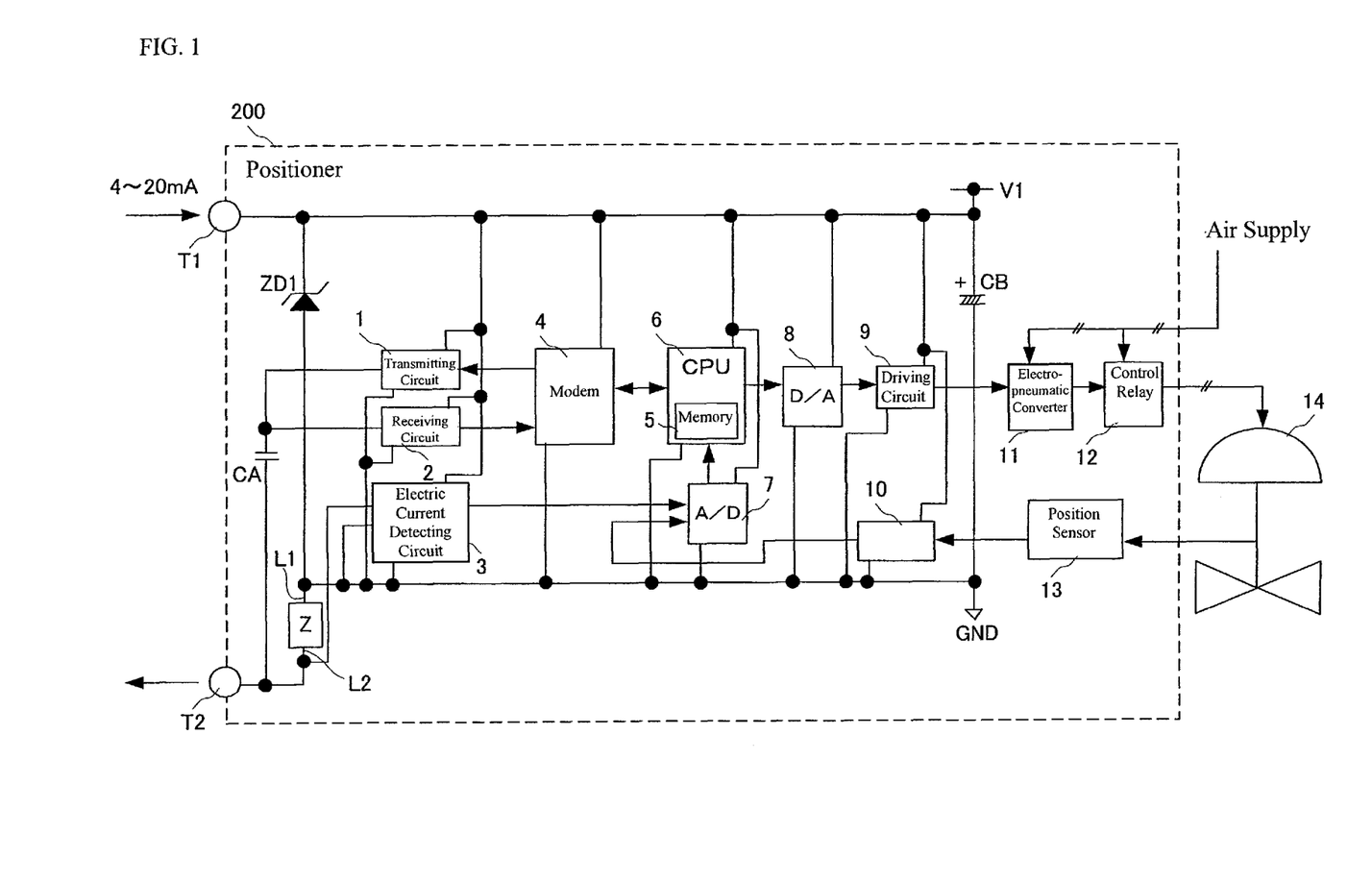
FIG. 1 is a diagram illustrating the configuration of an example of a positioner according to the present invention.

Examples according to the present invention can be explained below in detail, based on the drawings. FIG. 1 is a diagram illustrating the configuration of examples of a positioner according to the present invention. In this figure, codes that are the same as those in FIG. 8 indicate identical or equivalent structural elements as the structural elements explained in reference to FIG. 8, and explanations thereof are omitted.

In the below, an explanation is given regarding a positioner according to an example, and then regarding a positioner according to another example, but FIG. 1, which illustrates the overall configuration, is the same for both examples.

Figure 2:
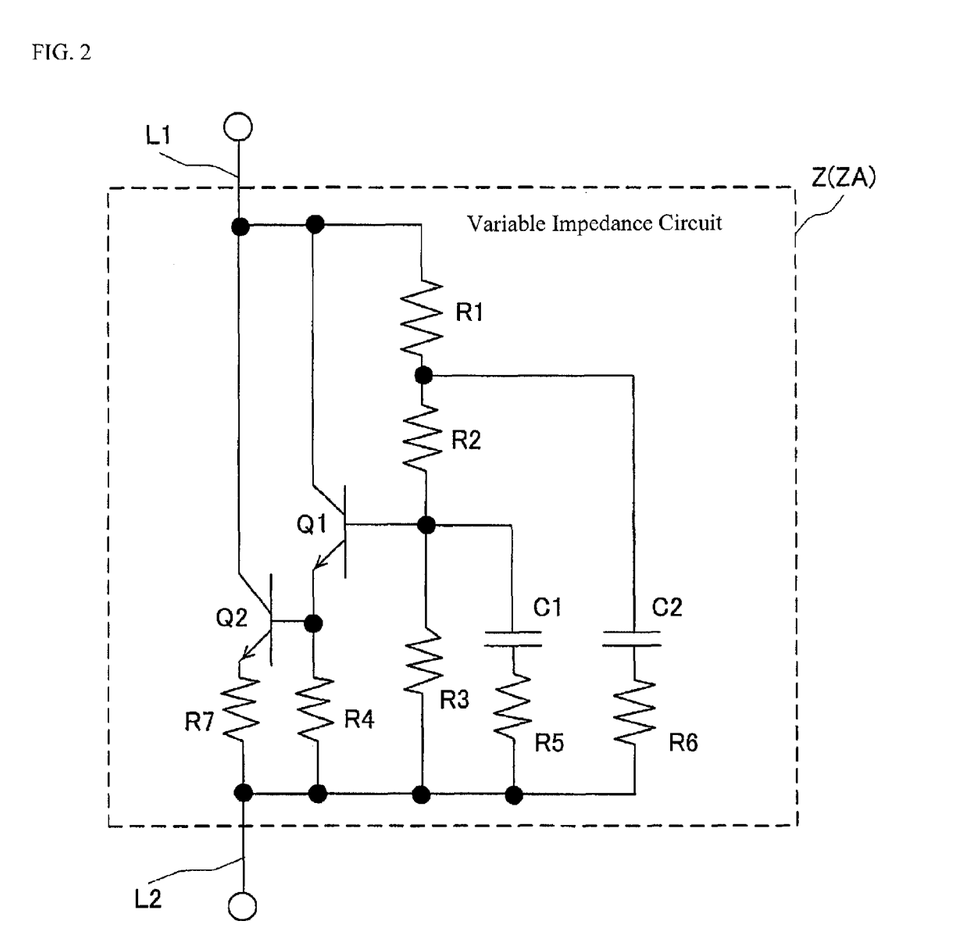
FIG. 2 is a diagram illustrating the configuration of a variable impedance circuit used as an active load in the positioner in the above example.

In the positioner 200 according to this example, the variable impedance circuit ZA illustrated in FIG. 2 is used as the active load Z.

That is, with the line L1 as the input line for the DC electric current signal and for the AC electric current signal that is superimposed on the DC electric current signal, and the line L2 as the output line for the DC electric current signal and the AC electric current signal that is superimposed on the DC electric current signal, the variable impedance circuit ZA, as illustrated in FIG. 2, is connected as the active load Z between the input line L1 and the output line L2.

The variable impedance circuit ZA is structured from: a series circuit of a first resistor R1, a second resistor R2, and a third resistor R3, connected between the input line L1 and the output line L2; a first transistor (an NPN transistor) Q1 with the collector thereof connected to the input line L1 and the base thereof connected to the connecting point between the resistors R2 and R3; a fourth resistor R4 that is connected between the emitter of the transistor Q1 and the output line L2; a first capacitor C1 having one end thereof connected to the connecting point between the resistors R2 and R3; a fifth resistor R5 connected between the other end of the capacitor C1 and the output line L2; a second capacitor C2 having one end thereof connected to the connecting point between the resistors R1 and R2; a sixth resistor R6 that is connected between the other end of the capacitor C2 and the output line L2; a second transistor (an NPN transistor) Q2 having the base thereof connected to the connecting point between the emitter of the transistor Q1 and the resistor R4, and a seventh resistor R7 that is connected between the emitter of the transistor Q2 and the output line L2.

In this variable impedance circuit ZA, the voltage that is produced at the connecting point between the resistors R2 and R3, that is, the voltage that is applied to the parallel circuit of the resistor R3 with the series circuit of the capacitor C1 and the resistor R5, is applied to the base of the transistor Q1, and the voltage that is produced at the connecting point between the emitter of the transistor Q1 and the resistor R4 is applied to the base of the transistor Q2. As a result, as the characteristic of the variable impedance circuit ZA, the impedance is low for a DC electric current signal and the impedance is height for an AC electric current signal.

Figure 3:
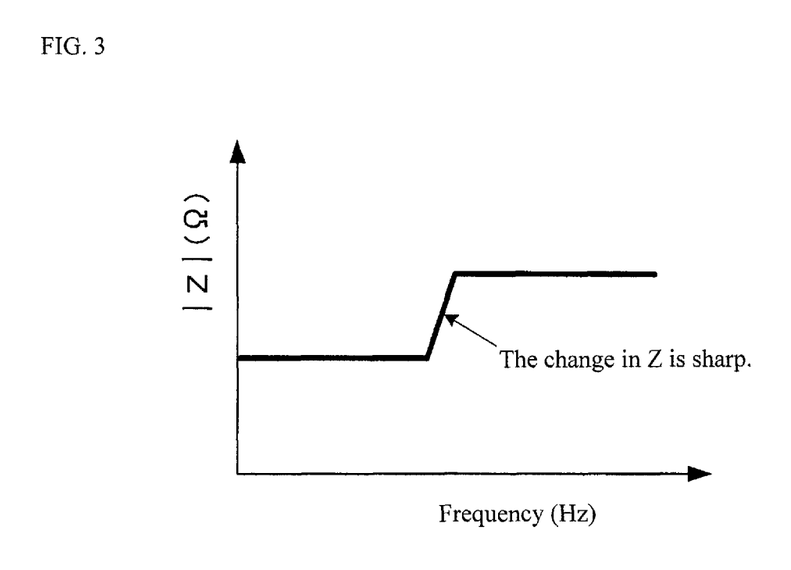
FIG. 3 is an impedance characteristic diagram of the variable impedance circuit used in the positioner in the above example.

Moreover, in the variable impedance circuit ZA, one end of a capacitor C2 is connected to a connecting point between resistors R1 and R2, and a resistor R6 is connected between the other end of the capacitor C2 and the output line L2, so that the structure is one wherein a low-pass filter (LPF2) wherein the time constant is determined primarily by the resistor R1, the capacitor C2, and the resistor R6 is added to a low-pass filter (LPF1) wherein the time constant is determined primarily by the resistor R2, the capacitor C1, and the resistor R5, causing the characteristics at the transition point between the low frequencies wherein the impedance is low and the high frequencies wherein the impedance is high to be sharp, as illustrated in the impedance characteristic diagram for the variable impedance circuit ZA in FIG. 3, thus increasing the robustness to the effect of low-frequency noise.

Figure 4:
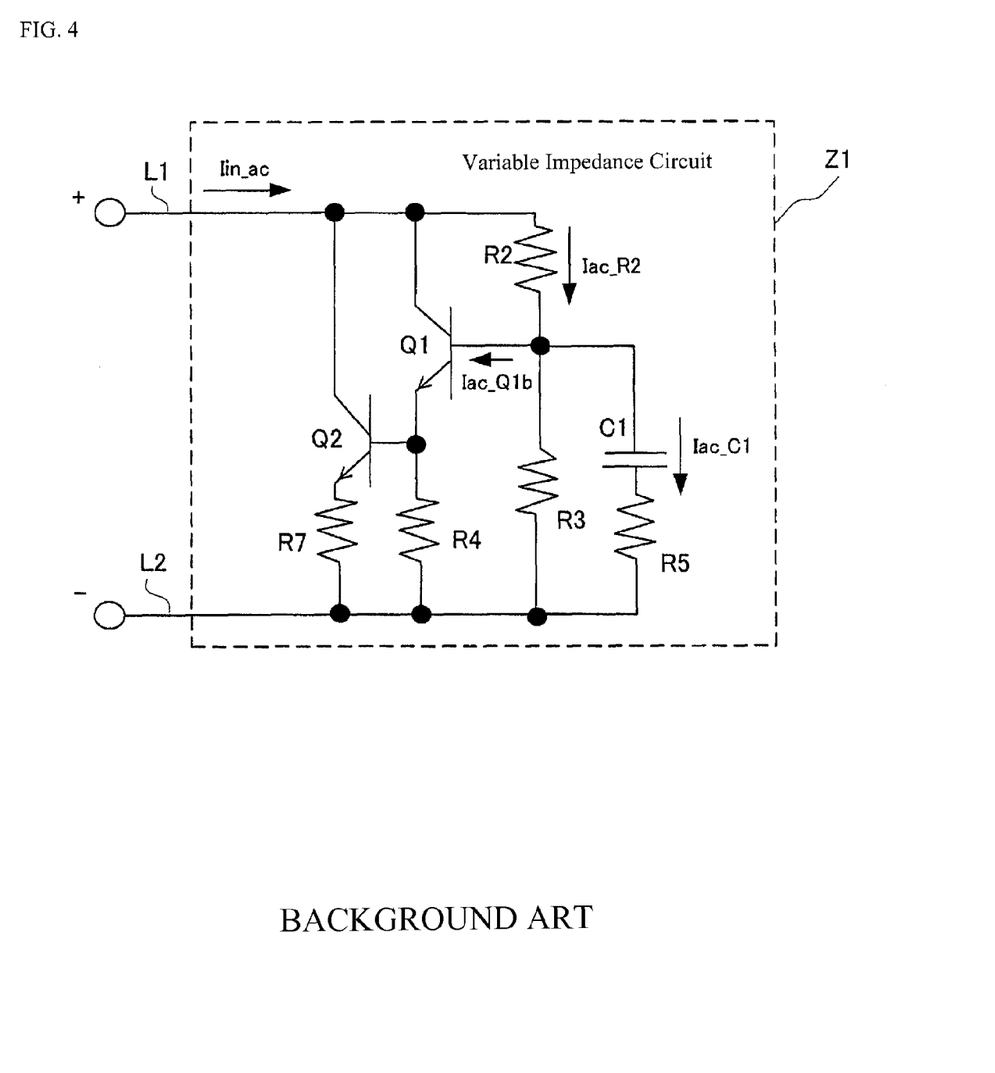
FIG. 4 is a diagram to which is added the flow of the electric current to assist in explaining the operation of the variable impedance circuit illustrated in FIG. 9.
Figure 5:
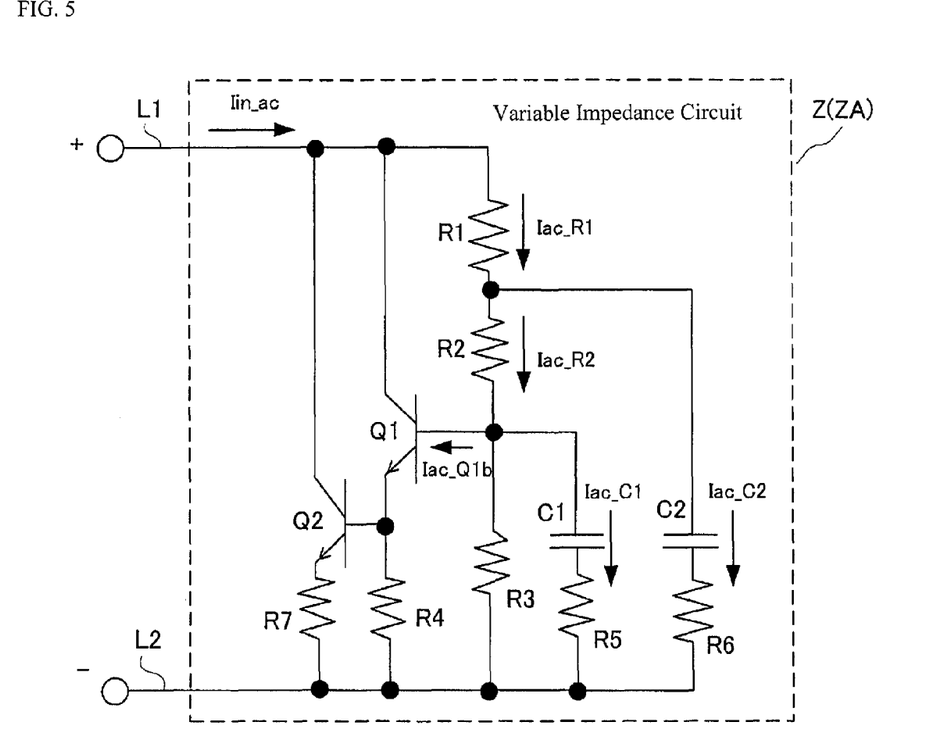
FIG. 5 is a diagram to which is added the flow of the electric current to assist in explaining the operation of the variable impedance circuit illustrated in FIG. 2.

FIG. 4 and FIG. 5 are used to explain in specifics the characteristics wherein the impedance is high being sharp at the transition point between the low frequencies wherein the impedance is low and the high frequencies in the variable impedance circuit ZA. FIG. 4 is a diagram to which is added the flow of the electric current to assist in explaining the operation of the conventional variable impedance circuit Z1 illustrated in FIG. 9. FIG. 5 is a diagram to which is added the flow of the electric current to assist in explaining the operation of the variable impedance circuit ZA of the example illustrated in FIG. 2.

First, the operation will be explained based on the conventional variable impedance circuit Z1. The input electric current Iin_ac is branched into Iac_R2, Iac_C1, and Iac_Q1b depending on the frequency characteristics of the LPF1, which are determined primarily by the time constant of the resistor R2, the capacitor C1, and the resistor R5. The frequency characteristics are such that the Iac_C1 is large and Iac_Q1b is small from the LPF cutoff frequency fc1 point, with the result that with an input electric current of a frequency that is higher than fc1, the collector current of the transistor Q1 (the AC component) can be small and the base current of the transistor Q2 (the AC component) can be small, and the collector current of the transistor Q2 (the AC component) can be small. This is equivalent to having a high AC impedance between the positive and negative terminals.

In contrast, in the variable impedance circuit ZA in the present example, the structure is one wherein the LPF2, which is determined primarily by the time constant of the resistor R1, the capacitor C2, and the resistor R6, is added to the LPF1 which is determined primarily by the time constant of the resistor R2, the capacitor C1, and the resistor R5. Here, when viewed from the point of the base of the transistor Q1 wherein Iac_Q1b flows, the LPF2 is connected in series with the LPF1, to structure a two-stage LPF from LPF2 and LPF1. As a result, when compared to the single-stage LPF of the LPF1 that is the conventional variable impedance circuit Z1, the characteristics can be those of the two-stage LPF wherein Iac_Q1b can be small at a high frequency above the cutoff frequency fc1 that determines the amplification of Iac_Q1b, where this characteristic can be sharp. This is equivalent to the frequency characteristics wherein the AC impedance between the positive and negative terminals is high being sharp at a frequency above fc1.

In the positioner 200 illustrated in FIG. 1, if, for example, the supply voltage from the double-wire transmission path is 15 V, and two of these positioners are connected in series, then the voltage between the input terminals T1 and T2 (the terminal voltage) will be 7.5 V. In this case, a minimum of 5 V is required for the power supply voltage for the internal circuitry, and thus only a voltage drop of up to 2.5 V is allowed for the active load Z.

However, in the variable impedance circuit ZA illustrated in FIG. 2, the transistors Q1 and Q2 are connected in a Darlington structure, so that the impedance for the DC electric current signal (the impedance on the DC frequency side) can be large, thus making it impossible to have the voltage drop in the active load Z be less than 2.5 V. Because of this, it is not possible to have the terminal voltage that enables the operation of the positioner 200 (the minimum operating terminal voltage) be less than 7.5 V, preventing two positioners 200 from being doubly connected between the two-wire transmission lines.

Figure 6:
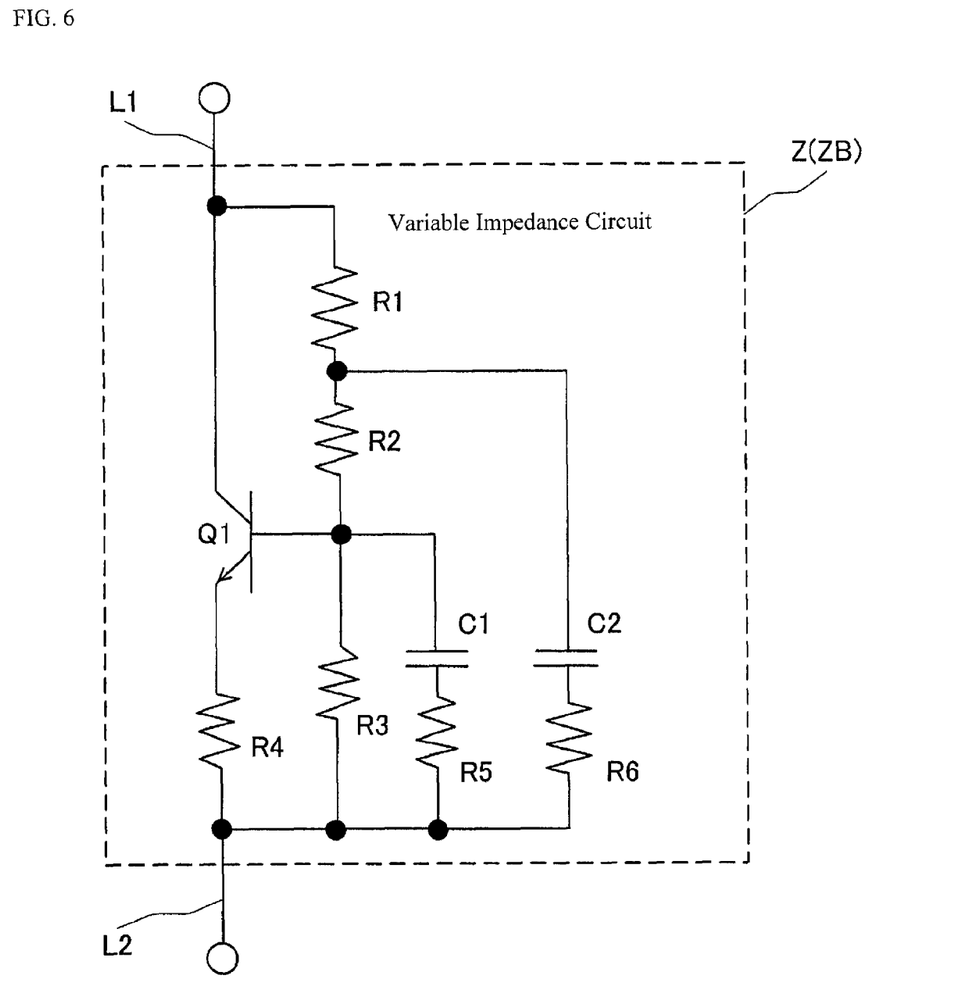
FIG. 6 is a diagram illustrating the configuration of a variable impedance circuit used as an active load in the positioner in another example.

Given this, in the positioner 200 according to this example, the variable impedance circuit ZB that is illustrated in FIG. 6 is used as the active load Z.

The variable impedance circuit ZA is structured from: a series circuit of a first resistor R1, a second resistor R2, and a third resistor R3, connected between the input line L1 and the output line L2; a first transistor (an NPN transistor) Q1 with the collector thereof connected to the input line L1 and the base thereof connected to the connecting point between the resistors R2 and R3; a fourth resistor that is connected between the emitter of the transistor Q1 and the output line R4; a first capacitor C1 having one end thereof connected to the connecting point between the resistors R2 and R3; a fifth resistor R5 connected between the other end of the capacitor C1 and the output line L2; a second capacitor C2 having one end thereof connected to the connecting point between the resistors R1 and R2; and a sixth resistor R6 that is connected between the other end of the capacitor C2 and the output line L2.

Figure 7:
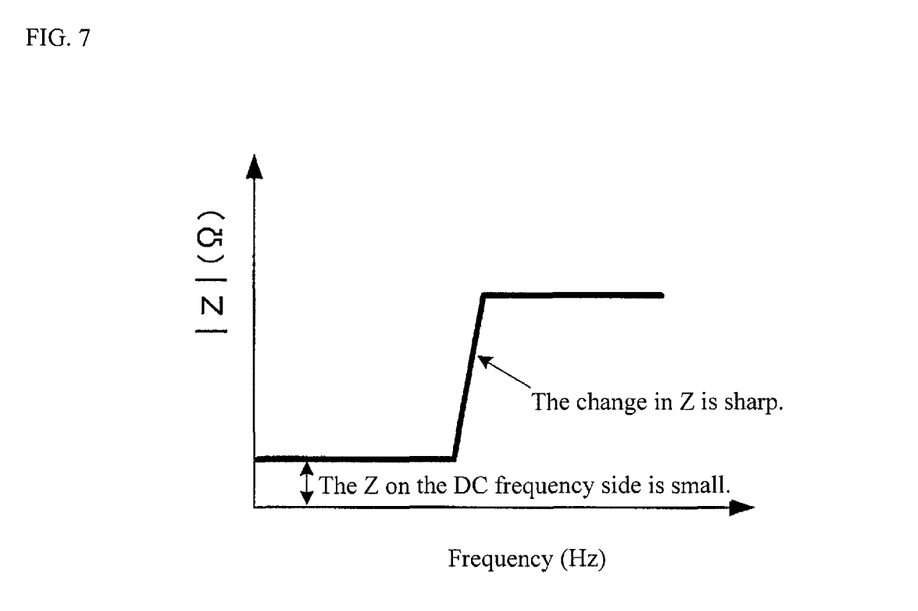
FIG. 7 is an impedance characteristic diagram illustrating the variable impedance circuit used in the positioner in the above example.

In this variable impedance circuit ZB, as with the variable impedance circuit ZA illustrated in FIG. 2, one end of a capacitor C2 is connected to the connecting point between the resistors R1 and R2, and the resistor R6 is connected between the other end of the capacitor C2 and the output line L2. Because of this, structure is one wherein a low-pass filter (LPF2), wherein the time constant is determined primarily by the resistor R1, the capacitor C2, and the resistor R6, is added to the low-pass filter (LPF1), wherein the time constant is determined primarily by the resistor R2, the capacitor C1, and the resistor R5, thus causing the characteristics of the transition point from the low frequencies wherein the impedance is low to the high frequencies wherein the impedance is high to be sharp, as illustrated in the impedance characters diagram for the variable impedance circuit ZB, in FIG. 7, and thus robust to the effects of low-frequency noise.

Moreover, in the variable impedance circuit ZB, the voltage that is produced at the connecting point between the resistors R1 and R2, that is, the voltage that is applied to the parallel circuit of the resistor R3 and the series circuit of the capacitor C1 and the resistor R5, is applied to the base of the transistor Q1. As a result, as the characteristic of the variable impedance circuit ZB, the impedance is low for a DC electric current signal and the impedance is high for an AC electric current signal.

While in the variable impedance circuit ZA illustrated in FIG. 2, the operation is through the transistors Q1 and Q2 that are connected in a Darlington configuration, in the variable impedance circuit ZB, the operation is through the single transistor Q1, alone, reducing the impedance on the DC frequency side (referencing FIG. 7), further reducing the voltage drop in the variable impedance circuit ZB.

For example, in the present example the voltage drop in the variable impedance circuit ZB is 1.3 V. Consequently, if, in the positioner 200, the power supply voltage in the internal circuitry is 5 V, that is, if the voltage V1 generated by the zener diode ZD1 is 5 V, then the minimum operating terminal voltage for the positioner 200 would be 6.3 V.

As a result, if, for example, the supply voltage from the double-wire transmission line is 15 V, then when two positioners 200 are doubly connected, the terminal voltage for the positioner 200 will be 7.5 V, but here the positioner 200 can operate even on the 7.5 V terminal voltage. The same is true when another load is connected in series with the positioner 200, where this can be supported until the terminal voltage drops below 6.3 V.

Moreover, in this variable impedance circuit ZB, as can be understood from a comparison with the variable impedance circuit ZA, illustrated in FIG. 2, the circuit structure is simplified, in a form wherein the transistor Q2 and the resistor R7 are eliminated, reducing the number of components, and thus achieving a reduction in costs.

Note that while NPN transistors were used as the transistors Q1 and Q2 in the examples set forth above, the variable impedance circuits ZA and ZB may be structured instead using PNP transistors.

What is claimed is:

1. A positioner for receiving a DC electric current through a pair of electric wires from a higher-level system, generating a local operating power supply from the DC electric current signal, along with controlling a degree of opening of a regulator valve in accordance with a value of the DC electric current signal, and receiving an AC electric current signal that is superimposed on the DC electric signal current, comprising a variable impedance circuit wherein the impedance relative to the DC electric current signal is low and the impedance relative to the AC electric current signal is higher than the impedance relative to the DC electric current signal; wherein the variable impedance circuit comprises:

an input line for a DC electric current signal and an AC electric current signal that is superimposed on the DC electric current signal;

an output line for a DC electric current signal and an AC electric current signal that is superimposed on the DC electric current signal;

a series circuit of a first resistor, a second resistor, and a third resistor, connected between the input line and the output line;

a transistor having the collector thereof connected to the input line and the base thereof connected to connecting point between the second resistor and the third resistor;

a fourth resistor connected between the emitter of the transistor and the output line;

a first capacitor having one end thereof connected to connecting point between the second resistor and the third resistor;

a fifth resistor connected between the other end of the first capacitor and the output line;

a second capacitor having one end thereof connected to the connecting point between the first resistor and the second resistor; and a sixth resistor connected between the other end of the second capacitor and the output line.

2. A positioner for receiving a DC electric current through a pair of electric wires from a higher-level system, generating a local operating power supply from the DC electric current signal, along with controlling a degree of opening of a regulator valve in accordance with a value of the DC electric current signal, and receiving an AC electric current signal that is superimposed on the DC electric signal current, comprising a variable impedance circuit wherein the impedance relative to the DC electric current signal is low and the impedance relative to the AC electric current signal is higher than the impedance relative to the DC electric current signal; wherein the variable impedance circuit comprises:

an input line for a DC electric current signal and an AC electric current signal that is superimposed on the DC electric current signal;

an output line for a DC electric current signal and an AC electric current signal that is superimposed on the DC electric current signal;

a series circuit of a first resistor, a second resistor, and a third resistor, connected between the input line and the output line;

a first transistor having the collector thereof connected to the input line and the base thereof connected to connecting point between the second resistor and the third resistor;

a fourth resistor connected between the emitter of the first transistor and the output line;

a first capacitor having one end thereof connected to connecting point between the second resistor and the third resistor;

a fifth resistor connected between the other end of the first capacitor and the output line;

a second capacitor having one end thereof connected to the connecting point between the first resistor and the second resistor;

a sixth resistor connected between the other end of the second capacitor and the output line;

a second transistor having the collector thereof connected to the input line and having the base thereof connected to the connecting point between the emitter of the first transistor and the fourth resistor; and a seventh resistor connected between the emitter of the second transistor and the output line.

* * * * *